(12) United States Patent
Kofler (10) Patent No.: US 9,969,355 B2
(45) Date of Patent: May 15, 2018

(54) INTEGRATED CIRCUIT DEVICE AND METHOD FOR DUAL-MODE TRANSPONDER COMMUNICATION

(71) Applicant: NXP B.V., Eindhoven (NL)

(72) Inventor: Robert Kofler, Graz Kroisbach (AT)

(73) Assignee: NXP B.V., Eindhoven (NL)

( * ) Notice: Subject to any disclaimer, the term of this patent is extended or adjusted under 35 U.S.C. 154(b) by 370 days.

(21) Appl. No.: 14/879,985

(22) Filed: Oct. 9, 2015

(65) Prior Publication Data

US 2017/0101075 A1    Apr. 13, 2017

(51) Int. Cl.
*B60R 25/04* (2013.01)
*H01H 47/00* (2006.01)
*B60R 25/021* (2013.01)

(52) U.S. Cl.
CPC .............................. *B60R 25/02105* (2013.01)

(58) Field of Classification Search
CPC .............................................. B60R 25/02105
USPC ........................................................ 307/10.5
See application file for complete search history.

(56) References Cited

U.S. PATENT DOCUMENTS

| 2008/0238679 | A1  | 10/2008 | Rofougaran et al. |
| 2009/0088077 | A1  | 4/2009  | Brown et al. |
| 2013/0106634 | A1  | 5/2013  | Savoj et al. |
| 2013/0109304 | A1* | 5/2013  | Marcu ............... G06K 7/0008 455/41.1 |
| 2013/0309970 | A1* | 11/2013 | Kofler ............... H04B 5/0062 455/41.1 |

* cited by examiner

*Primary Examiner* — Carlos Amaya
(74) *Attorney, Agent, or Firm* — Rajeev Madnawat (57) ABSTRACT

In an embodiment, an integrated circuit (IC) device is disclosed. In the embodiment, the IC device includes a load modulation module, a current source coupled to the load modulation module, an interface to a resonant circuit, the interface coupled to the load modulation module and the current source, and an interface to a charge source, the interface coupled to the current source, wherein the load modulation module is configured to provide a signal for transmission by modifying the load through the load modulation module, and wherein the current source is configured to provide a signal for transmission by generating pulses of current.

18 Claims, 7 Drawing Sheets

INTEGRATED CIRCUIT DEVICE AND METHOD FOR DUAL-MODE TRANSPONDER COMMUNICATION

BACKGROUND

Many countries require new vehicles to include an immobilizer device in ignition circuitry of the vehicles. An immobilizer is a security system, typically made up of an immobilizer base station and a transponder in a key. The immobilizer base station is typically located in the steering column or in the dashboard of a vehicle and is able to prevent fuel flow or ignition of the vehicle (e.g., by breaking an electrical circuit or otherwise disabling signal flow within the circuitry of the vehicle) when the key is not present. Properly configured, an immobilizer can greatly reduce the possibility of vehicle theft because standard hotwiring methods are ineffective.

SUMMARY

In an embodiment, an integrated circuit (IC) device is disclosed. In the embodiment, the IC device includes a load modulation module, a current source coupled to the load modulation module, an interface to a resonant circuit, the interface coupled to the load modulation module and the current source, and an interface to a charge source, the interface coupled to the current source, wherein the load modulation module is configured to provide a signal for transmission by modifying the load through the load modulation module, and wherein the current source is configured to provide a signal for transmission by generating pulses of current.

In another embodiment, the IC is configured to utilize either the load modulation module or the current source.

In another embodiment, the IC device determines if load modulation or active transmission should be used based on an initialization command.

In another embodiment, the IC device further comprises a command interpreter configured to interpret a received initialization command, enable the current source and disable the load modulation, and disable the current source and enable the load modulation module according to a mode indicated by the initialization command.

In a second embodiment, a transponder is disclosed. In the embodiment, the transponder includes a resonant circuit serving as an antenna, a load modulation module coupled to the resonant circuit, and a current source coupled to the resonant circuit, wherein the load modulation module is configured to transmit a signal via the resonant circuit by opening and closing a switch in order to modify the load on the resonant circuit, and wherein the current source is configured to transmit a signal via the resonant circuit by delivering electric current to the resonant circuit to generate pulses in a magnetic field.

In another embodiment, the transponder includes a plurality of antennas.

In another embodiment, the plurality of antennas are arranged in an orthogonal pattern.

In another embodiment, the antenna with the strongest signal is used for transmission.

In another embodiment, the transponder utilizes either the load modulation module or the current source to transmit a signal via the resonant circuit.

In another embodiment, the transponder further includes a command interpreter configured to interpret a received initialization command, enable the current source and disable the load modulation, and disable the current source and enable the load modulation module according to a mode indicated by the initialization command.

In another embodiment, the command interpreter is implemented with a microcontroller, the microcontroller including a demodulator configured to receive a serial bitstream and convert the bitstream into at least one of a byte or a word.

In a third embodiment, a method for transmitting a signal via a resonant circuit of a transponder is disclosed. In the embodiment, the method involves selecting a transmission mode via control logic in an IC device, receiving, at an IC device, a command carried by a carrier signal, and if a transmission mode utilizing load modulation is selected, configuring response data stored in memory of the IC device as specified by the command and providing data for wireless transmission using load modulation to a load modulation module of the IC device, and, if a transmission mode utilizing active transmission is selected, charging a capacitor coupled to the IC device using the carrier signal, configuring response data stored in memory of the IC device as specified by the command, and providing data for wireless transmission using charge from the capacitor delivered by a current source of the IC device.

In another embodiment, if a transmission mode utilizing active transmission is selected, the method further involves determining if the IC device utilizing the transmission mode is coupled to multiple antennas and, if multiple antennas are found, providing the data to the antenna with the strongest channel for transmission.

In another embodiment, determining which antenna has the strongest channel involves adding loads to channels coupled to each antenna and selecting the antenna with the highest amplitude.

In another embodiment, the transmission mode is selected in response to a command received from a base station.

In another embodiment, selecting a transmission mode, in accordance with a mode indicated by the command received from the base station, involves at least one of enabling the current source and disabling the load modulation module and disabling the current source and enabling the load modulation module.

In another embodiment, the transmission mode is selected by pre-configuring the IC device utilizing the transmission mode.

In another embodiment, the carrier signal is turned off after the capacitor is finished charging.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
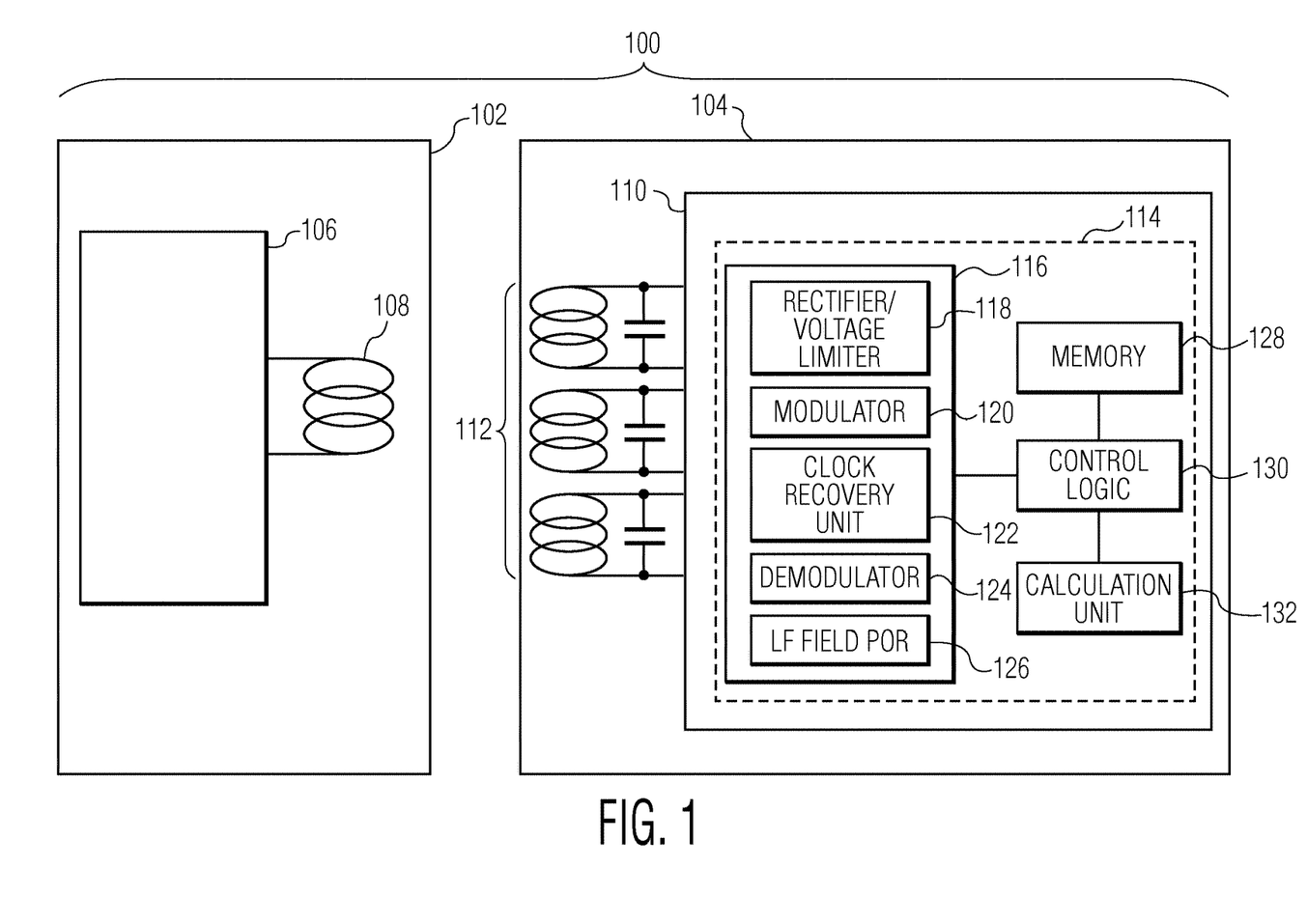
FIG. 1 depicts a typical immobilizer system.

FIG. 1 depicts a typical immobilizer system 100, which is a two-part system having a base station 102 (typically located in the steering column or in the dashboard of a vehicle) and a transponder 104 (typically located in a key fob). In an embodiment, the base station is configured with a single antenna 108 that is used to both transfer energy and data in a write direction and to receive data in a read direction. The single antenna is connected to a base station circuit 106. Elements of the base station are well known in the field and not described further herein. In an embodiment, the transponder has an array of antennas 112 (e.g., three antennas) connected to a transponder circuit 110. The core components 114 of the transponder circuit include memory 128, control logic 130, a calculation unit 132, as well as an RF front end 116 that includes a rectifier/voltage limiter 118, a modulator 120, a clock recovery unit 122, a demodulator 124, and a low-frequency field power-on reset (LF Field POR) 126. In an embodiment, the array of antennas are arranged in an orthogonal pattern such that the transponder can pick up a magnetic field in multiple orientations. The rectifier/voltage limiter insures that proper voltage and current are delivered to the transponder, the modulator converts data from the memory to an analog signal for transmission by the antennas, and the demodulator converts analog signals to digital signals for processing by the control logic and calculation unit. The clock recovery unit approximates and phase-aligns data received via the antennas when data is sent without an accompanying clock signal, and the LF Field POR places the transponder in a desired state (e.g., the configuration of counters, registers, memory, or other circuits in the transponder) when a magnetic field of the base station is detected.

Figure 2:
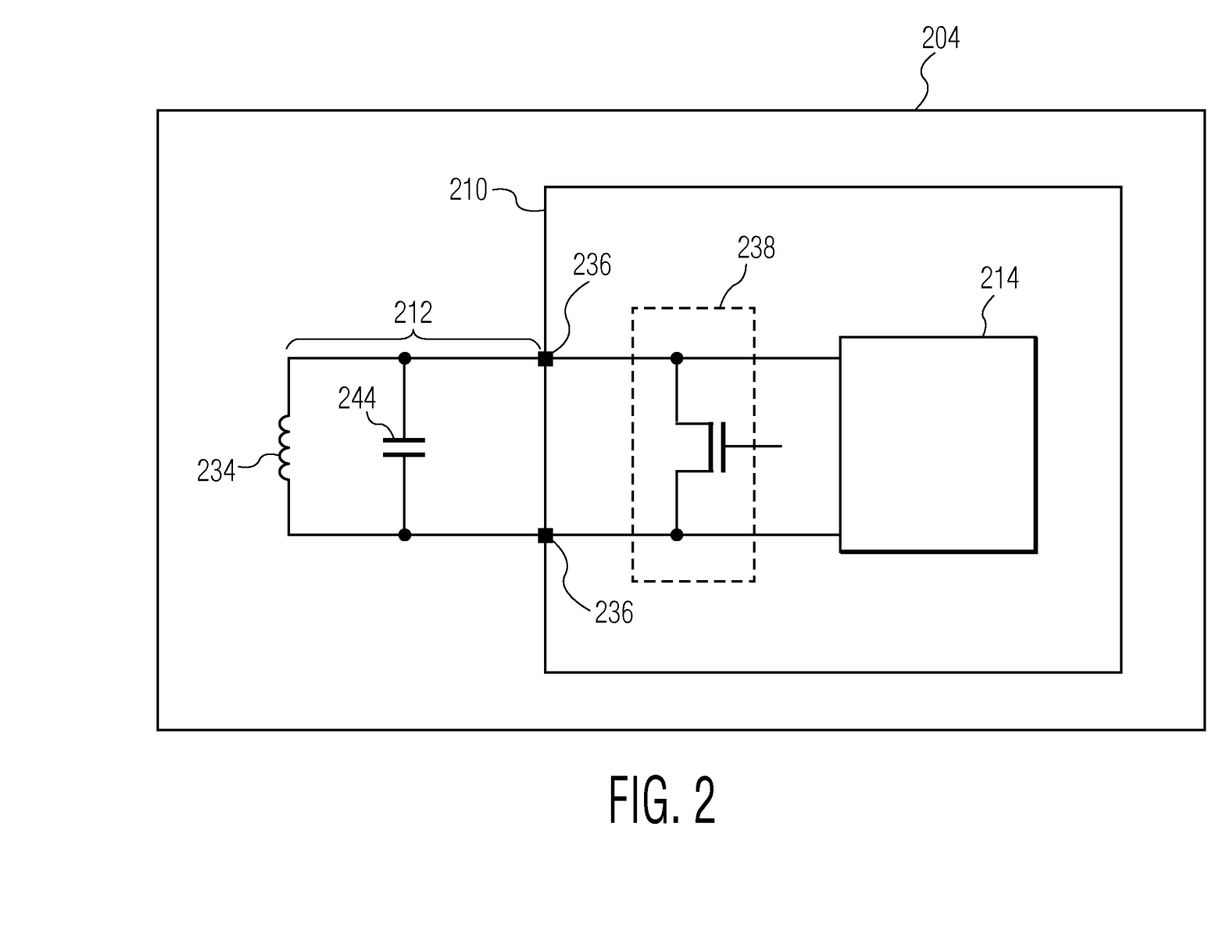
FIG. 2 is a circuit diagram of a transponder configured to use load modulation.

Typically, a transponder is configured for a transmission mode utilizing either load modulation or active transmission, but not both since different circuitry and protocols or at least different protocol timings are required for each transmission mode. For example, FIG. 2 is a circuit diagram of a transponder 204 (similar to transponder 104 in FIG. 1) that is configured to utilize load modulation to communicate with a base station. In the example of FIG. 2, the transponder includes a resonant circuit 212 connected to a transponder circuit 210, the resonant circuit serving as an antenna. In an embodiment, the resonant circuit is an L-C circuit including an inductive coil 234 and a capacitor 244, and the transponder circuit is an integrated circuit (IC) device fabricated on a single substrate (e.g., a single IC die) to which the resonant circuit connects at pins 236. In other embodiments, the transponder circuit may be a single packaged device that includes more than one IC die. The antenna can be external to the transponder circuit (as shown) or internal to the transponder circuit. In addition to the core components 214 of the transponder circuit 210, the transponder circuit further includes a load modulation module 238. In an embodiment, the load modulation module includes a switch and resistors (not shown) in series such that the switch can be opened and closed to change the resistance of the antenna. In operation, a base station generates a magnetic field that interacts with the antenna and the resistance of the antenna can be modulated (e.g., the switch can be closed to increase the load or opened to decrease the load) to transmit data back to the base station.

Figure 3:
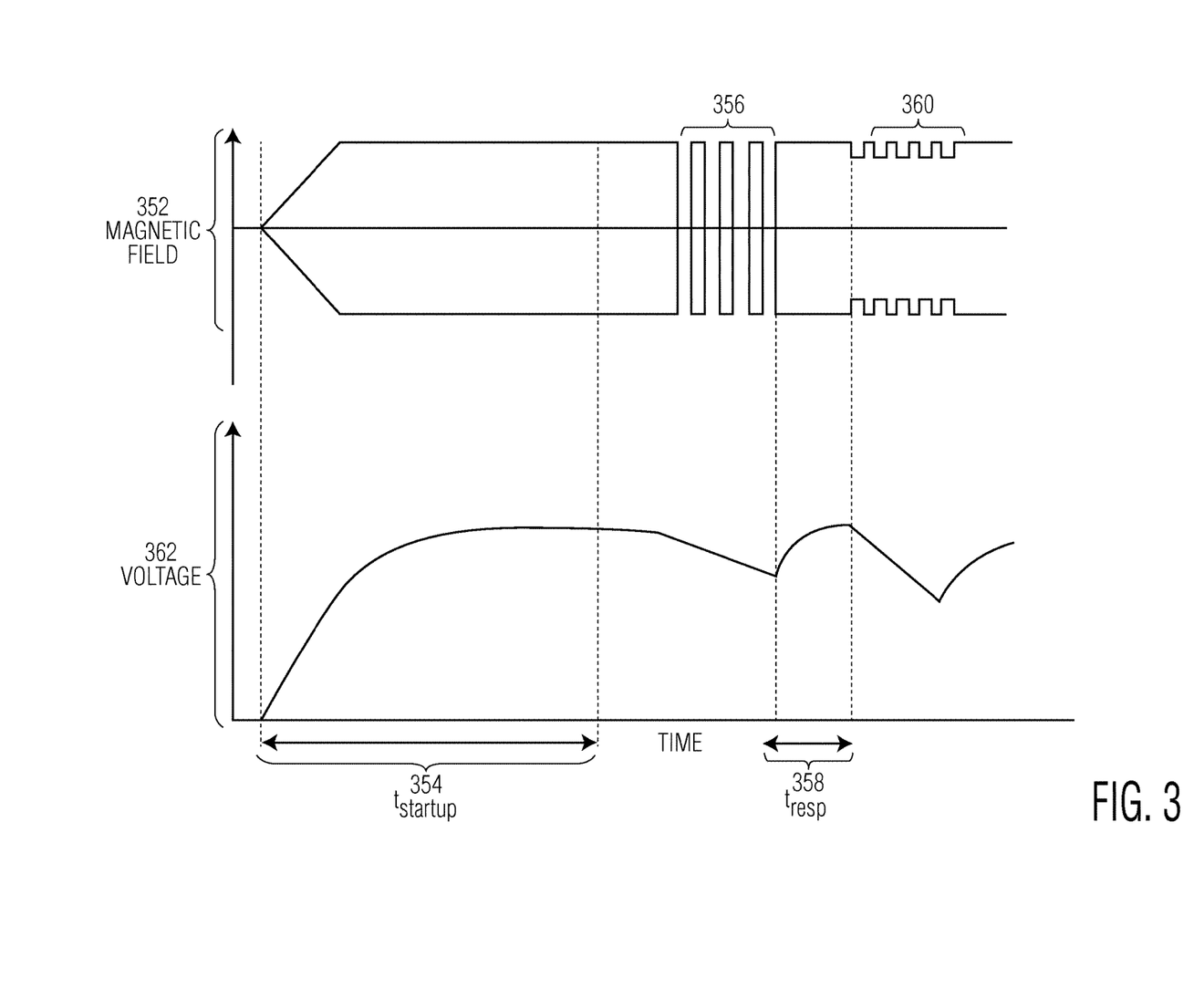
FIG. 3 illustrates a timeline of the load modulation protocol that is followed by an immobilizer system.

In order to receive and transmit data, a transponder configured to utilize load modulation, such as the transponder 204 of FIG. 2, follows a load modulation protocol. FIG. 3 illustrates a timeline of the load modulation protocol that is followed by an immobilizer system. The upper portion 352 of the timeline indicates that a base station is generating a magnetic field for the duration of data transfer between the base station and the transponder and the lower portion 362 of the timeline indicates the voltage within the transponder. After a startup time ($t_{startup}$) 354, the transponder is ready to receive a command 356 from the base station. In an embodiment, the command indicates how the transponder should configure response data and, optionally if the transponder is not already configured, indicates that the transponder should use load modulation to transmit response data. Once the last bit of the command is transmitted, the base station turns on a receiver after a delay ($t_{resp}$) 358 and the transponder starts transmission of the configured response data using load modulation, which creates variance 360 in the magnetic field generated by the base station. In an embodiment, the process is repeated for each communication between the base station and the transponder.

Figure 4:
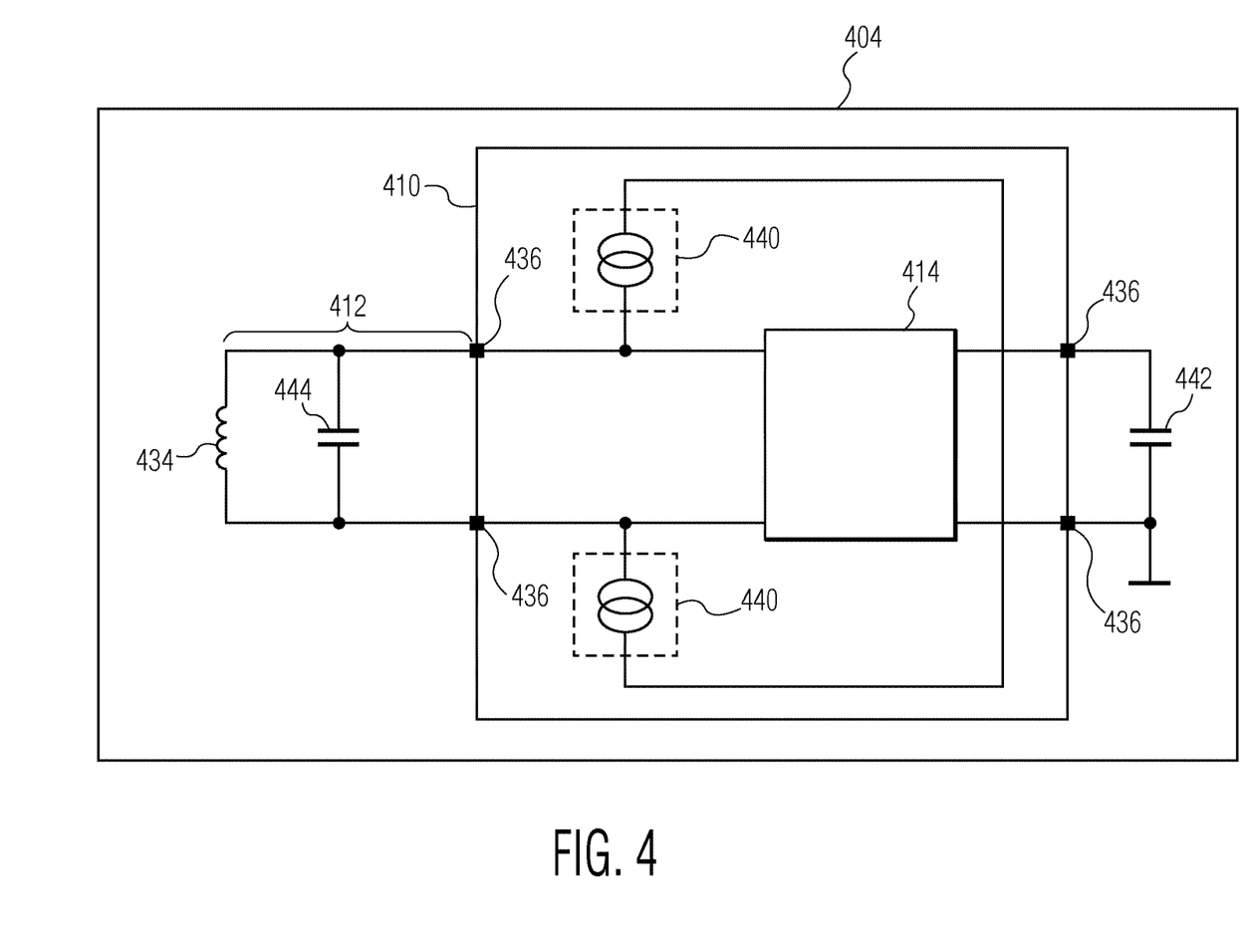
FIG. 4 is a circuit diagram of a transponder configured to use active transmission.

Alternatively, active transmission can be used to transmit data. FIG. 4 is a circuit diagram of a transponder 404 (similar to the transponder 104 in FIG. 1) that is configured to use active transmission. In the example of FIG. 4, the transponder includes a resonant circuit 412 connected to a transponder circuit 410, the resonant circuit serving as an antenna. In an embodiment, the resonant circuit is an L-C circuit including an inductive coil 434 and a capacitor 444, and the transponder circuit is an integrated circuit (IC) device fabricated on a single substrate (e.g., a single IC die) to which the resonant circuit connects at pins 436. In other embodiments, the transponder circuit may be a single packaged device that includes more than one IC die. In an embodiment, the antenna could be external to the transponder circuit (as shown), but could be internal to the transponder circuit in other embodiments. In addition to core components 414 of the transponder circuit, the transponder further includes two current sources 440. A capacitor 442, which is external to the transponder circuit is connected via additional pins 436, but, alternatively, could be internal to the transponder circuit without the use of the additional pins. The capacitor can be a single large capacitor or two or more smaller capacitors connected selectively via pins as needed (e.g., when the transponder will be using active transmission). In operation, a base station generates a magnetic field that interacts with the antenna and the capacitor 442 is charged from the magnetic field. Then, in order to transmit data back to the base station, a rectifier/voltage limiter (e.g., which is included in the core components 414) is configured to convert charge stored in the capacitor as needed by the current sources to transmit data back to the base station.

Figure 5:
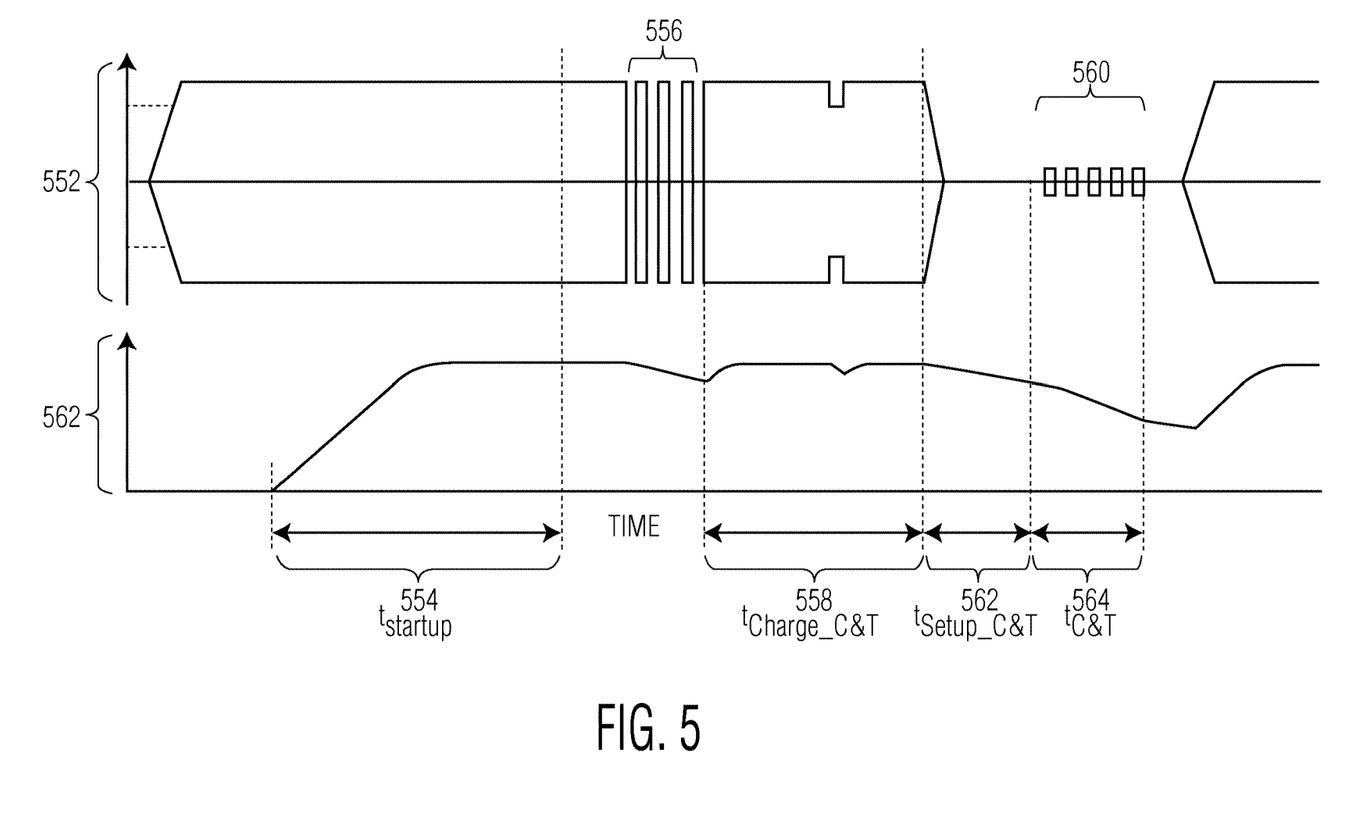
FIG. 5 illustrates a timeline of the active transmission protocol that is followed by an immobilizer system.

In order to receive and transmit data, a transponder configured to utilize active transmission, such as the transponder 404 shown in FIG. 4, follows an active transmission protocol. FIG. 5 illustrates a timeline of the active transmission protocol that is followed by an immobilizer system. The upper portion 552 of the timeline indicates the presence of a magnetic field (e.g., created by the base station or by the transponder) and the lower portion 562 of the timeline indicates the voltage within the transponder. After a startup time ($t_{startup}$) 554, the transponder is ready to receive a command 556 from the base station. In an embodiment, the command indicates how the transponder should configure response data and, optionally if the transponder is not already configured, indicates that the transponder should use active transmission to transmit response data. After the last bit of the command has been transmitted, the base station continues to generate a magnetic field for a period of time ($t_{Charge\_C\&T}$) 558 to allow a capacitor (e.g., the capacitor 442 in FIG. 4) in the transponder to charge, while the transponder determines which antenna (if there are multiple antennas attached) has the strongest channel. Once the capacitor is charged, the base station terminates the magnetic field and transmission is initialized ($t_{setup\_C\&T}$) 562. Data is then transmitted to the base station by the transponder by creating pulses of magnetic field 560 during a transmission period ($t_{C\&T}$) 564 using the charge stored in the capacitor. In an embodiment, the process is repeated for each communication between the base station and the transponder.

Legacy immobilizer systems have typically utilized load modulation, but some immobilizer systems are transitioning to the use of active transmission in order to increase the communication distance. While load modulation is typically more robust than active transmission (e.g., due to the larger signal used with load modulation), active transmission is often favored for its greater signal range. However, conventional transponders are configured to support load modulation or active transmission, but not both simultaneously because different circuitry is required for each transmission mode (as shown in FIGS. 2 and 4). In order to continue to support maintenance of immobilizer systems, service centers may require new equipment, such as diagnostic tools or key replication devices, in order to interface with immobilizer systems using the active transmission protocol. The need for new equipment to support active transmission in addition to the upkeep of legacy equipment to support load modulation can be costly. Thus, automobile manufacturers and service companies often choose to support load modulation or active transmission, but not both.

In an embodiment, an integrated circuit (IC) device is disclosed. In the embodiment, the IC device includes a load modulation module, a current source coupled to the load modulation module, an interface to a resonant circuit, the interface coupled to the load modulation module and the current source, and an interface to a charge source, the interface coupled to the current source, wherein the load modulation module is configured to provide a signal for transmission by modifying the load through the load modulation module, and wherein the current source is configured to provide a signal for transmission by generating pulses of current. Such an IC device can be used to produce a vehicle key that supports both load modulation and active transmission. Accordingly, even if a vehicle supports an immobilization system using active transmission between a transponder in the key and a base station in the steering column, a service center can perform maintenance on the vehicle using active transmission equipment as well as legacy load modulation equipment because the transponder supports both transmission modes.

Figure 6:
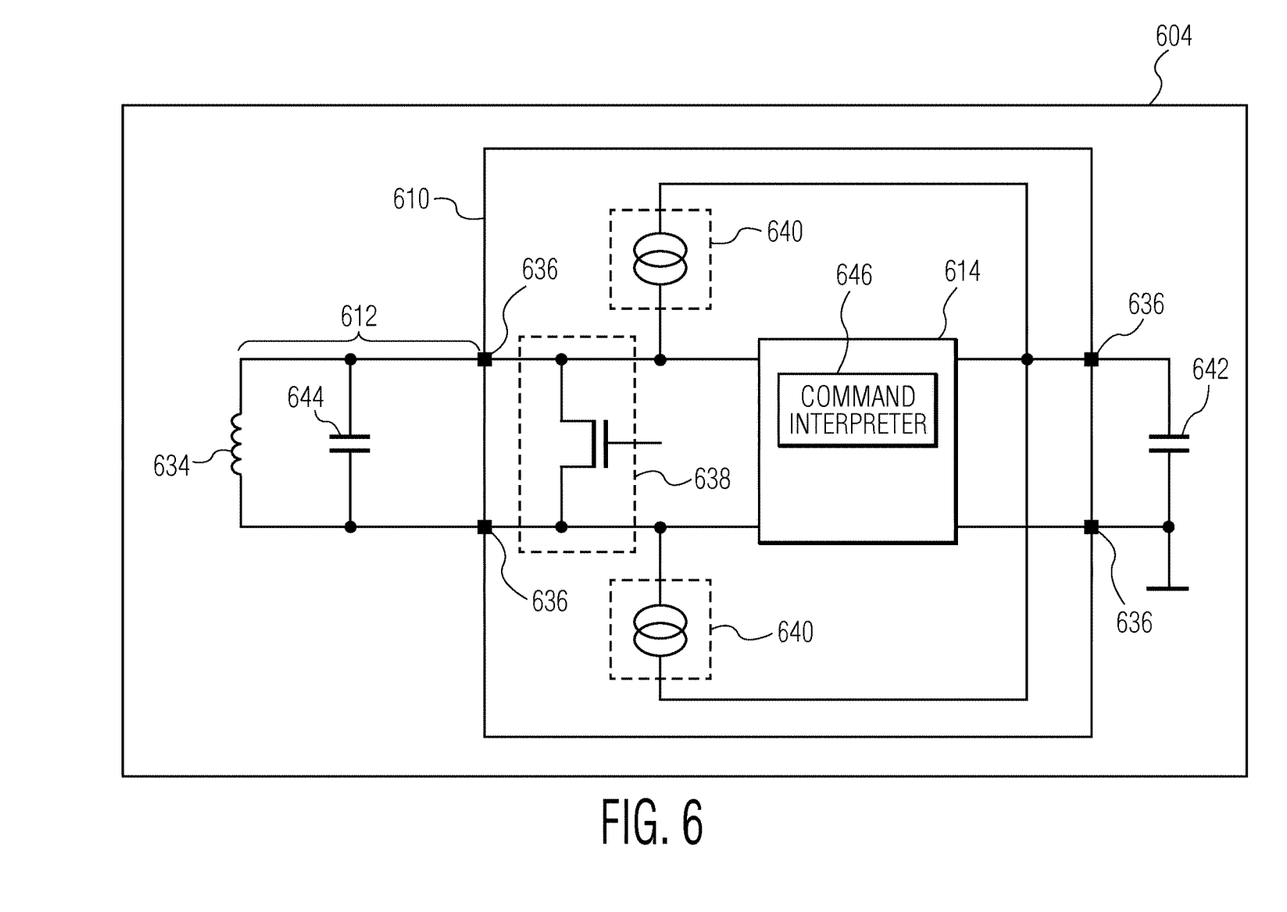
FIG. 6 depicts a circuit diagram of a transponder configured in accordance with an embodiment of the invention.

In order to support both load modulation and active transmission, the circuity of a transponder includes the features of a load modulation transponder (e.g., as described with reference to FIG. 2) and the features of an active transmission transponder (e.g., as described with reference to FIG. 4). FIG. 6 depicts a circuit diagram of a transponder 604 configured in accordance with an embodiment of the invention. In an embodiment, the transponder includes a resonant circuit 612 connected to a transponder circuit 610, the resonant circuit serving as one (or more) antenna. In an embodiment, the resonant circuit is an L-C circuit including an inductive coil 634 and a capacitor 644, and the transponder circuit is an integrated circuit (IC) device fabricated on a single substrate (e.g., a single IC die) to which the resonant circuit connects at pins 636. In other embodiments, the transponder circuit may be a single packaged device that includes more than one IC die. In an embodiment, the one or more antennas can be external to the transponder circuit (as shown), but can be internal in other embodiments. The transponder circuit includes core components 614 of a transponder circuit, such as the core components 114 described in reference to FIG. 1. The transponder circuit further includes a load modulation module 638 and one or more current sources 640 (two shown) that can be connected to any of the one or more antennas. The current sources are further coupled to a capacitor 642. The capacitor can be external to the transponder circuit and connected to the transponder circuit at pins 636 (as illustrated in FIG. 6), but can also be internal to the transponder circuit. In an embodiment, the current sources can be connected to a node that is subsequently connected to the capacitor rather than being directly connected to the capacitor. In an embodiment, the core components of the transponder circuit further comprise a command interpreter 646 configured to interpret a received initialization command and to enable the current source and disable the load modulation module according to a mode indicated by the initialization command. In an embodiment, the command interpreter can be implemented with a microcontroller, the microcontroller including a demodulator configured to receive a serial bitstream and convert the bitstream into a form more suited for processing by the microcontroller (e.g., a byte or a word). In an embodiment, the microcontroller can include software or further hardware configured to process the converted bitstream using a state machine to check for valid or invalid commands. In operation, the transponder will utilize either the load modulation module to transmit data using load modulation or utilize the current sources to transmit data using active transmission, but not both at the same time. Depending on how the transponder transmits data, either the load modulation protocol (as described with reference to FIG. 3) or the active transmission protocol (as described with reference to FIG. 5) will be followed accordingly. Thus, a single transponder can support load modulation and active transmission, which allows for equipment using load modulation to interface with modern immobilizer systems and, thus, service centers do not need to have new equipment on site to service the modern immobilizer systems. Additionally, so configured, the circuitry provides the novel benefit of reducing interfere in the performance of load modulation or active transmission because the current sources are only active when active transmission is being performed and the load modulator is disabled when active transmission is being performed.

Figure 7:
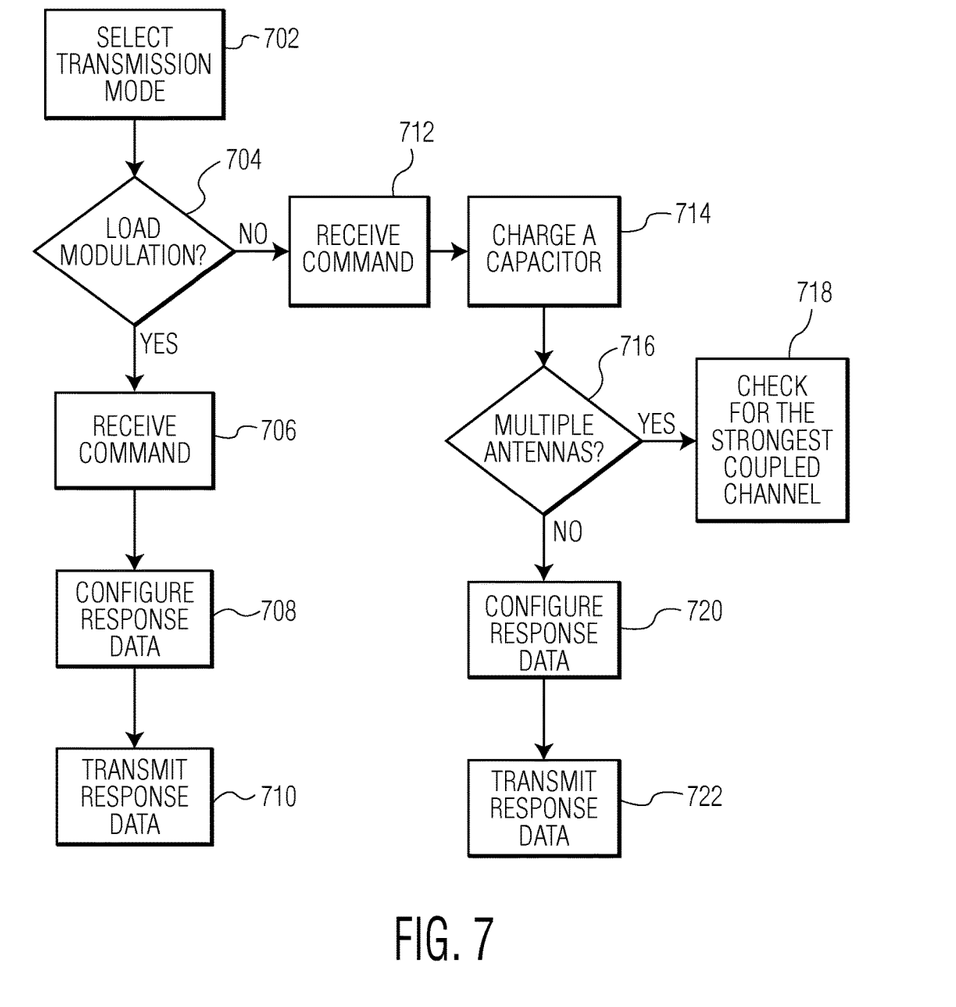
FIG. 7 is a process flow diagram of a method for configuring and communicating data via a transponder in accordance with an embodiment of the invention.

Because both load modulation and active transmission are supported in a single transponder, the transponder can be configured to determine whether to utilize load modulation or active transmission to communicate with a base station when initializing communication with the base station. FIG. 7 is a process flow diagram of a method for configuring and communicating data via a transponder in accordance with an embodiment of the invention. At block 702, the transponder selects a single transmission mode (e.g., selects either load modulation or active transmission, but not both). In an embodiment, the transponder selects a transmission mode based on a command received (e.g., an initialization command) from the base station that identifies the transmission mode with which the base station can interface. In another embodiment, the initial transmission mode is pre-configured. At decision point 704, if the load modulation transmission mode is selected, then, at block 706, the transponder receives a command. In an embodiment, the command is sent by the base station and indicates how response data should be configured. At block 708, the transponder configures the response data (in accordance with the manner indicated at block 706) and, at block 710, the transponder transmits the response data back to the base station using load modulation.

If, at decision point 704, the load modulation transmission mode is not selected and the active transmission mode is selected instead, then, at block 712, the transponder receives a command. In an embodiment, the command is sent by the base station and indicates how response data should be configured. At block 714, a capacitor begins charging. In an embodiment, the capacitor is the capacitor 642, as shown in FIG. 6, which is charged using the magnetic field of the base station. While the capacitor is charging, at decision point 716, the transponder determines if multiple antennas are available. If there are multiple antennas available, then, at block 718, the transponder determines which antenna is coupled to the strongest channel. In an embodiment, the transponder determines which channel is the strongest by adding loads to the different channels and comparing measurements of amplitudes to pick the channel with the highest amplitude. In another embodiment, the strongest channel can be determined by measuring current or voltage in the antennas directly as well as other envisioned methods of determining channel strength. At block 720, the transponder configures response data (in accordance with the manner indicated at block 712) and, at block 722, the transponder transmits the response data back to the base station using active transmission. In an embodiment, if there are multiple antennas, the transponder uses the antenna with the strongest channel to transmit the response data. Thus, depending on the transmission mode of the base station, the transponder can select a transmission mode accordingly, which allows the same transponder to interface with both an immobilizer system and service equipment using load modulation and an immobilizer using active transmission.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. An integrated circuit (IC) device comprising:
   a load modulation module;
   a control logic;
   a memory coupled to the control logic to store response data, wherein the control logic is configured to prepare the stored response data to transmit as specified by a received command;
   a current source coupled to the load modulation module;
   an interface to a resonant circuit, the interface coupled to the load modulation module and to the current source; and
   an interface to a charge source, the interface coupled to the current source;
   wherein the load modulation module is configured to provide a signal for transmission by modifying the load through the load modulation module; and
   wherein the current source is configured to provide a signal for transmission by generating pulses of current.
2. The IC device of claim 1, wherein the IC is configured to utilize either the load modulation module or the current source.
3. The IC device of claim 2, wherein the IC device determines if load modulation or active transmission is to be used based on an initialization command.

4. The IC device of claim 1, wherein the IC device further comprises a command interpreter configured to interpret a received initialization command, enable the current source and disable the load modulation, and disable the current source and enable the load modulation module according to a mode indicated by the initialization command.

5. A transponder, the transponder comprising:
a resonant circuit serving as an antenna;
a load modulation module coupled to the resonant circuit;
a current source coupled to the resonant circuit;
a command interpreter to interpret a received initialization command and to enable the current source and disable the load modulation module according to a mode indicated by the initialization command;
a memory coupled to a control logic to store response data, wherein the control logic is configured to prepare the stored response data to transmit as specified by the received initialization command; and
wherein the load modulation module is configured to transmit a signal via the resonant circuit by opening and closing a switch in order to modify the load on the resonant circuit; and
wherein the current source is configured to transmit a signal via the resonant circuit by delivering electric current to the resonant circuit to generate pulses in a magnetic field.

6. The transponder of claim 5, wherein the transponder comprises a plurality of antennas.

7. The transponder of claim 6, wherein the plurality of antennas are arranged in an orthogonal pattern.

8. The transponder of claim 6, wherein the antenna with the strongest signal is used for transmission.

9. The transponder of claim 5, wherein the transponder utilizes either the load modulation module or the current source to transmit a signal via the resonant circuit.

10. The transponder of claim 5 further comprising a command interpreter configured to interpret a received initialization command, enable the current source and disable the load modulation, and disable the current source and enable the load modulation module according to a mode indicated by the initialization command.

11. The transponder of claim 10, wherein the command interpreter is implemented with a microcontroller, the microcontroller including a demodulator configured to receive a serial bitstream and convert the bitstream into at least one of a byte or a word.

12. A method for transmitting a signal via a resonant circuit of a transponder, the method comprising:
selecting a transmission mode via control logic in an IC device;
receiving, at an IC device, a command carried by a carrier signal; and
if a transmission mode utilizing load modulation is selected:
configuring response data stored in memory of the IC device as specified by the command; and
providing data for wireless transmission using load modulation to a load modulation module of the IC device; and
if a transmission mode utilizing active transmission is selected:
charging a capacitor coupled to the IC device using the carrier signal;
configuring response data stored in memory of the IC device as specified by the command; and
providing data for wireless transmission using charge from the capacitor delivered by a current source of the IC device.

13. The method of claim 12, wherein if a transmission mode utilizing active transmission is selected, the method further comprises:
determining if the IC device utilizing the transmission mode is coupled to multiple antennas; and
if multiple antennas are found, providing the data to the antenna with the strongest channel for transmission.

14. The method of claim 13, wherein determining which antenna has the strongest channel comprises adding loads to channels coupled to each antenna and selecting the antenna with the highest amplitude.

15. The method of claim 12, wherein the transmission mode is selected in response to a command received from a base station.

16. The method of claim 15, wherein selecting a transmission mode, in accordance with a mode indicated by the command received from the base station, comprises at least one of:
enabling the current source and disabling the load modulation module; and
disabling the current source and enabling the load modulation module.

17. The method of claim 12, wherein the transmission mode is selected by pre-configuring the IC device utilizing the transmission mode.

18. The method of claim 12, wherein the carrier signal is turned off after the capacitor is finished charging.

* * * * *